United States Patent
Golde et al.

(10) Patent No.: US 9,600,393 B2
(45) Date of Patent: Mar. 21, 2017

(54) TESTING OF APPLICATION SERVICE VERSIONS ON LIVE DATA

(71) Applicant: Facebook, Inc., Menlo Park, CA (US)

(72) Inventors: Ittai M. Golde, Sunnyvale, CA (US); Maher Afif Saba, Seattle, WA (US); Charity Hope Majors, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 163 days.

(21) Appl. No.: 14/665,885

(22) Filed: Mar. 23, 2015

(65) Prior Publication Data
US 2016/0283348 A1 Sep. 29, 2016

(51) Int. Cl.
*G06F 9/45* (2006.01)
*G06F 11/36* (2006.01)
*G06F 9/44* (2006.01)

(52) U.S. Cl.
CPC ............ *G06F 11/3612* (2013.01); *G06F 8/70* (2013.01)

(58) Field of Classification Search
None
See application file for complete search history.

(56) References Cited

U.S. PATENT DOCUMENTS

2011/0099147 A1* 4/2011 McAlister ......... G06F 17/30581
707/639

* cited by examiner

*Primary Examiner* — Chuck Kendall
(74) *Attorney, Agent, or Firm* — Perkins Coie LLP (57) ABSTRACT

Some embodiments include a computer server implementing a splitter engine to perform testing of a pre-production version of an application service against live traffic. The splitter engine can receive a client request for a live application service. The splitter engine can generate a live response by processing the client request through a live instance of a production engine. The splitter engine can select one or more request processors to process the client request and a processing order based on a request type of the client request. The splitter engine can process the client request through the one or more request processors according to the processing order after responding to the client request with the live response. The splitter engine can compare states of at least two of the production engine and the one or more request processors.

20 Claims, 6 Drawing Sheets

TESTING OF APPLICATION SERVICE VERSIONS ON LIVE DATA

BACKGROUND

Various computer executable applications utilize a client-server architecture to centralize data processing and storage on an application server to enable sophisticated services to client devices. Developers of these applications (e.g., web-based and mobile applications) face numerous challenges associated with rolling out updates to application service engines on the application servers corresponding to the client applications. An update to an application service engine may corrupt a production database or may cause a halt to an application service that millions or billions of users depend on. Hence, it is important to test a pre-production version of an application service engine in scenarios as close to live traffic as possible. Conventional off-line testing methods fail to satisfy this requirement.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Several embodiments are directed to performing an A/B testing of at least two versions of an application service in a live application service system (e.g., a computer server system providing at least an application service to user devices in real-time). A/B testing of an application service is a controlled experiment of at least two variants (e.g., a control variant and a treatment variant) of the application service by comparing the performance of the variants.

A conventional application service system is implemented with a production engine to process incoming client requests (e.g., data creation, retrieval, update, or delete (CRUD) requests). Under conventional schemes, a new version of the production engine is tested off-line. Once ready, the new version can replace the production engine.

In contrast to the conventional application service system, in several embodiments, a live application service system includes both a production engine and a shadow engine and processes incoming client requests through both engines. The shadow engine can be a test version (e.g., the treatment variant) that may potentially replace the production engine in the future. In several embodiments, the live application service system tests the shadow engine against live traffic. The live application service system advantageously implements a processing protocol that prevents adverse impact on the user experience associated with servicing real-time client requests while enabling the A/B testing of the shadow engine against the production engine. The live application service system can compare performance of the shadow engine against the production engine while both engines process real-time client requests. The live application service system advantageously stress tests the shadow engine in a realistic operating environment that the shadow engine would need to handle once it goes into production.

The live application service system can implement one or more splitter engines. A splitter engine is a component that enforces a client request processing protocol in response to receiving a client request for the application service (e.g., through both the production engine and the shadow engine). A first splitter engine can determine the type of an incoming service request. For an incoming read operation, the first splitter engine can process the incoming read request through the production system and then subsequently through the shadow system. A comparison can be made between the states of the production system and the shadow system to identify an anomaly (e.g., a difference in operating states). For an incoming write (e.g., create, update, or delete) request, the first splitter engine can process the incoming write request through the production system, and then through a second splitter engine. The second splitter engine can then process the incoming write request through a "jailed" production system. In several embodiments, the jailed production system utilizes the same logic engine as the production system, but does not interact with the production database of the production system. The jailed production system can maintain a jailed production database separate from the production database. The jailed production database can be seeded with a mirror/snapshot of the production database. In some embodiments, the live application service system can seed the jailed production database prior to the client request processing protocol is initiated or instantiated in the second splitter engine. The live application service system can make a comparison of the states of the jailed production system and the shadow system to identify one or more anomalies, if any. For example, an "anomaly" can be a difference in resource consumption metrics, performance metrics, operating memory states, corresponding data entries, corresponding request responses, or any combination thereof. The addition of the jailed production system protects the actual production system against data corruption during the A/B testing.

In some embodiments, a splitter engine receiving incoming client requests can select an appropriate request processing protocol (e.g., a processing order amongst request processors, including for example, the production engine, the jailed production engine, the shadow engine, another splitter engine, or any combination thereof). The splitter engine can select the request processing protocol based on a processing hierarchy defining what types of client requests are processed by which of the request processors, if any. For example, some types of client requests are only processed by the production engine. For another example, some types of client read requests are processed by at least the production engine and the shadow engine. For another example, some types of client write requests are processed by at least the production engine, the jailed production engine, and the shadow engine. In some examples, some types of client requests are processed by multiple shadow engines representing different pre-production test versions for an application service. The splitter engine can identify the type of a client request, for example, by identifying metadata associated with the client request or determining a pattern (e.g., a regular expression pattern) in the client request. This way, the splitter engine advantageously controls the operating environment for each test version of the application service. This enables a finer control to perform experiments using live traffic.

Similarly, the anomaly detection component of the live application service can implement a detection hierarchy defining what types of anomalies to be ignored and what types of anomalies should be recorded as a potential error. In several embodiments, the anomaly detection component identifies an anomaly by determining a difference between states (e.g., operating performance metrics, resource consumption metrics, operating memory states, corresponding data entries, corresponding request responses, or any combination thereof) of a shadow engine and a production engine or between states of a shadow engine and a jailed production engine. The anomaly detection component can identify the type of an anomaly by identifying metadata associated with the determined difference, magnitude of the determined difference, type/location of the determined difference, etc. This way, the anomaly detection component advantageously reduces false alarm rates by systematically ignoring expected differences between different versions of the application service. For example, various timestamps can be ignored because an incoming client request is processed through the engines at different times.

Several embodiments enable a way to register, track, and resolve crashes in test application versions. Being able to capture and fix crashes efficiently means fewer frustrated users and better retention—one of the most important metrics to any developer. Several embodiments provide live testing without the need for embedding code to interface with third-party crash reporting tools (e.g., by embedding one or more software development kits (SDKs) and/or code for accessing one or more application programming interfaces (APIs)).

For example, when a developer releases a new version of an application service that unfortunately "features" a newly introduced bug, the live application service system can detect the bug, pinpoint the issue, and generate a report enabling the developer to resolve problems quickly and easily. The report can be provided through a user interface generated by the live application service system in real time or asynchronously the testing. The live application service system can automatically cache and send one or more crash reports if connectivity is spotty to a device of the developer. The live application service system can track bugs on a per-version basis, so that if the developer has reintroduced an old bug in a new version of an application service, the live application service system can still ensure that the developer is notified of the bug and fix the bug as soon as possible—even if the developer has previously marked the bug as "resolved."

In several embodiments, the live application service system stores parameters of client request traffic to facilitate a "replay" of the traffic at a later time. The splitter engines can log the incoming requests and transform them accordingly such that the incoming requests can be replayed locally without involving the production system. For example, the replay engine can generate parameters for the logged requests and re-hash some of the parameters according to metadata that is consistent with a testing sandbox.

Figure 1:
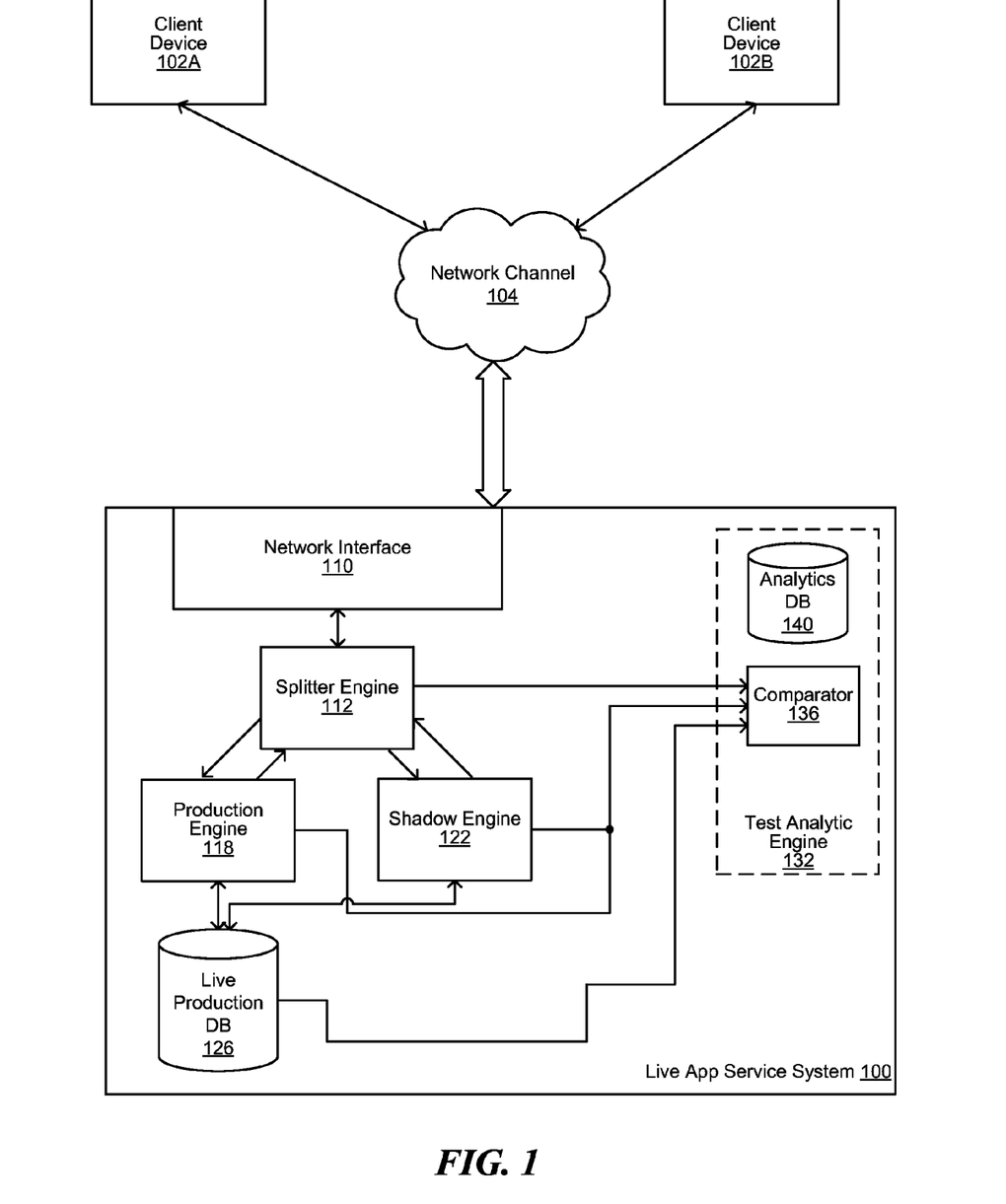
FIG. 1 is a block diagram of an example of a control flow of a live application service system that compares performance of a pre-production version and a production version of an application service, in accordance with various embodiments.

Referring now to the figures, FIG. 1 is a block diagram of an example of a control flow of a live application service system 100 that compares performance of a pre-production version and a production version of an application service, in accordance with various embodiments. The live application service system 100 provides an application service over a network channel 104 for one or more clients (e.g., a client device 102A or a client device 102B, collectively as the "client devices 102"). For example, the application service can be a social networking service, a location-based service, a data service, a media service, or any combination thereof. The client devices 102, for example, can include a mobile device, a stationary computing device, another application service system, a computer server, a virtual server, or any combination thereof.

The live application service system 100 can be coupled to the network channel 104 via a network interface 110. In several embodiments, the live application service system 100 can implement a splitter engine 112 to manage input and/or output (I/O) messages between the live application service system 100 and the client devices 102. The splitter engine 112 can implement a request response protocol in accordance with the method 300 of FIG. 3. In several embodiments, the splitter engine 112 communicates with a production engine 118 (e.g., the production version of the application service) and a shadow engine 122 (e.g., a pre-production version of the application service). The production engine 118 is responsible for processing live requests from the client devices 102. The shadow engine 122 is a test version that provides limited processing of the live requests in a controlled sandbox.

Figure 2:
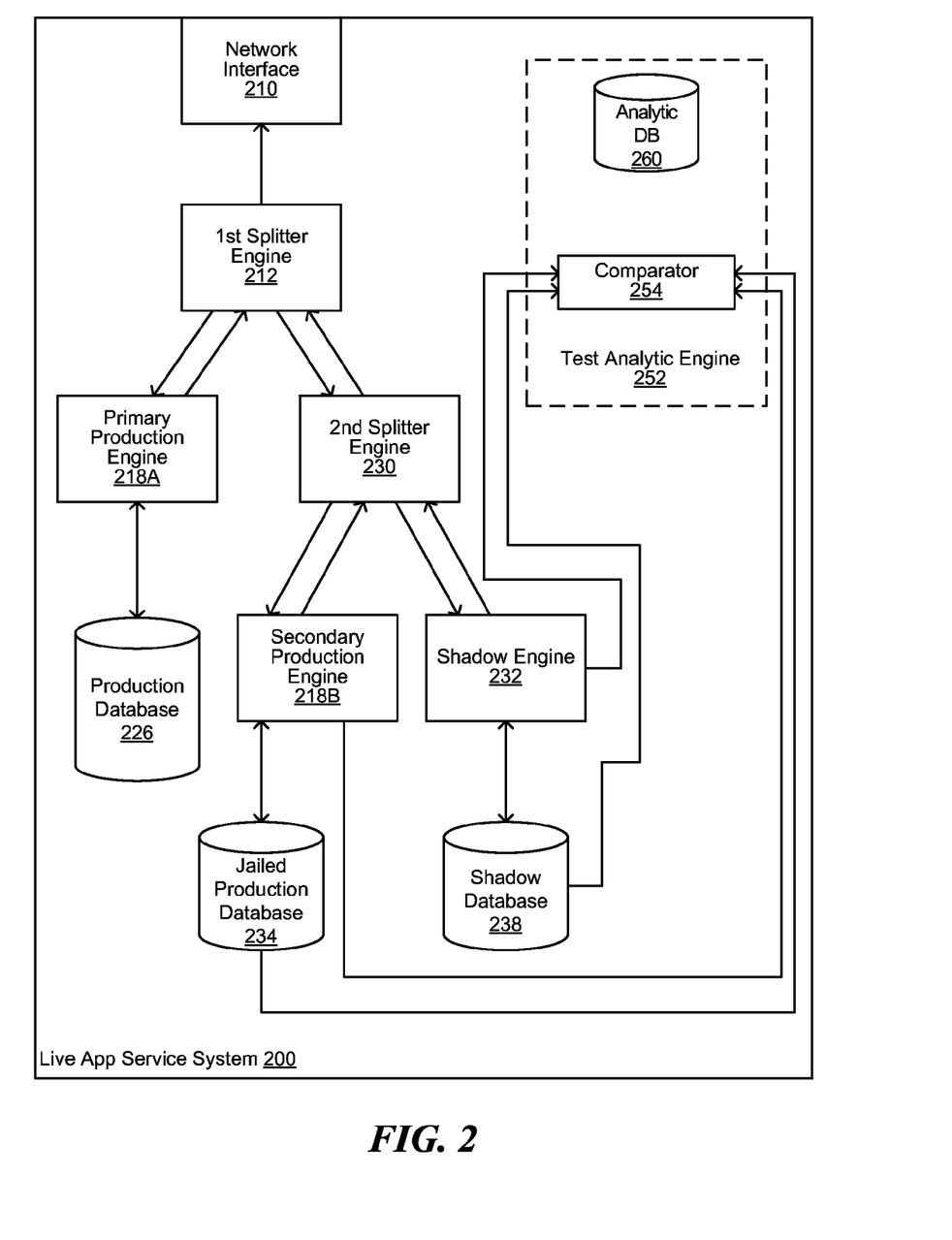
FIG. 2 is a block diagram of an example of a control flow of a live application service system that compares performance of a preproduction version and a simulated production version of an application service, in accordance with various embodiments.

In some embodiments, in response to receiving a client request, the splitter engine 112 processes the client request through the production engine 118. For example, the production engine 118 can process a read request (e.g., a "GET" command or a "FIND" command) by retrieving data from a live production database 126. For another example, the production engine 118 can process a write request (e.g., a create command, an update/modify command, or a delete command) by changing a dataset in the live production database 126. FIG. 1 illustrates an example of components in the live application service system 100 that can at least respond to client read requests. FIG. 2 further illustrates an example of components in a live application service system 200 that can at least respond to client write requests.

When the production engine 118 processes the client request, the production engine 118 can generate and send a response message (e.g., a live response) back to the splitter engine 112. The splitter engine 112 can then send the response message back to the requesting client. The response message can include a payload (e.g., data retrieved in response to a read request) and/or a confirmation of performed service(s).

After the production engine 118 processes the client request and/or the splitter engine 112 sends the response message back to the requesting client, the splitter engine 112 can process the client request through the shadow engine 122. For example, the shadow engine 122 can process a read request by retrieving data from the live production database 126.

In some embodiments, the splitter engine 112 of FIG. 1 is the first splitter engine 212 of FIG. 2. In these embodiments, the splitter engine (e.g., the splitter engine 112 or the first splitter engine 212) can identify the type of an incoming client request, and determine whether to process it through the shadow engine 122 (e.g., having received a client read request) or the second splitter engine 230 (e.g., having received a client write request).

In some embodiments, the live application service system 100 includes multiple shadow engines. The splitter engine 112 can serve as a gatekeeper to determine what kind of client requests are process through which of the shadow engines, if at all. For example, the splitter engine 112 can select no shadow engine, a single shadow engine, or multiple shadow engines to process an incoming client request.

In several embodiments, a test analytic engine 132 can compute a difference between states of the production engine 118 and the shadow engine 122. The test analytic engine 132 can be coupled to the splitter engine 112. The test analytic engine 132 can compute the difference in response to the shadow engine 122 finishing the processing of the client request. In some embodiments, the test analytic engine 132 can be part of the live application service system 100. In some embodiments, the test analytic engine 132 is a standalone component in communication with the live application service system 100.

The test analytic engine 132 can include a comparator module 136. The comparator module 136 is configured to compare and track the states of the production engine 118 and the shadow engine 122. For example, the comparator module 136 can track and compare performance metric, resource consumption, and/or operating memory states of the production engine 118 and the shadow engine 122.

The splitter engine 112 can alert the comparator module 136 when the shadow engine 122 completes its processing of a client request. In response to the alert, the comparator module 136 can compute a difference of the states of the production engine 118 and the shadow engine 122. The computed difference can be stored in an analytic database 140. The analytic database 140 can include one or more testing reports. In some embodiments, each testing report is associated with a version of the shadow engine 122. In some embodiments, each testing report is associated with a client request. In some embodiments, each testing report is associated with a timestamp.

FIG. 2 is a block diagram of an example of a control flow of a live application service system 200 that compares performance of a preproduction version and a simulated production version of an application service, in accordance with various embodiments. For example, the live application service system 200 can be the live application service system 100 of FIG. 1. The live application service system 200 provides an application service over a network channel (e.g., the network channel 104 of FIG. 1) for one or more clients (e.g., the client devices 102 of FIG. 1). For example, the application service can be a social networking service, a location-based service, a data service, a media service, or any combination thereof.

The live application service system 200 can be coupled to the network channel via a network interface 210. In several embodiments, the live application service system 200 can implement a first splitter engine 212 to manage input and/or output (I/O) messages between the live application service system 200 and the client devices. The first splitter engine 212 can implement a request response protocol in accordance with the method 300 of FIG. 3 or the method 400 of FIG. 4. The first splitter engine 212 can identify the type of an incoming client requests, and determine which processing order (e.g., a request response protocol) to execute. For example, when processing a read request, the first splitter engine 212 can communicate with a primary production engine (e.g., a primary production engine 218A or the production engine 118 of FIG. 1) and a shadow engine (e.g., the shadow engine 122 of FIG. 1). For another example, when processing a write request, the first splitter engine 212 can communicate with the primary production engine 218A and a second splitter engine 230. The primary production engine 218A is responsible for processing live requests from the client devices. For example, the live requests can be write requests that modify one or more data sets in a production database 226. In some embodiments, the primary production engine 218A is a first running instance of a production engine.

The second splitter engine 230 can communicate with a secondary production engine 218B (e.g., a simulated production version of the application service) and a shadow engine 232 (e.g., a pre-production version of the application service, for example, the shadow engine 122). The secondary production engine 218B can be a second running instance of the production engine. In some embodiments, the computer executable logics of the primary production engine 218A are identical to the computer executable logics of the secondary production engine 218B. The secondary production engine 218B can be maintained to shelter the production database 226 from being corrupted during testing to prevent or to prevent other negative impact to the service provided by the primary production engine 218A. In response to write requests (e.g., creation, update, or deletion requests), the secondary production engine 218B can modify a dataset in a jailed production database 234 that is separate and independent from the production database 226. The shadow engine 232 can be a test version (e.g., that may become the production engine one day if validated) that provides limited processing of the live requests in a controlled sandbox (e.g., a shadow database 238).

In some embodiments, in response to receiving a client request, the first splitter engine 212 processes the client request through the primary production engine 218A. For example, the primary production engine 218A can process a write request by modifying a dataset in the production database 226. For illustrative purposes, FIG. 2 illustrates components in the live application service system 200 that responds at least to client write requests. However, other components (e.g., components shown in FIG. 1) can be removed and/or added to process client read requests.

When the primary production engine 218A processes the client request, the primary production engine 218A can generate and send a response message (e.g., a live response) back to the first splitter engine 212. In response, the first splitter engine 212 can send the response message back to the requesting client. The response message can acknowledge that the target dataset in the production database 226 has been modified (e.g., data having been created, updated, or deleted).

After the primary production engine 218A processes the client request and/or the first splitter engine 212 sends the response message back to the requesting client, the first splitter engine 212 can then process the client request through the second splitter engine 230. The second splitter engine 230 can then process the client request through the secondary production engine 218B. For example, when processing a write request, the secondary production engine 218B can modify data in the jailed production database 234. In some embodiments, the jailed production database 234 can be instantiated as a mirror copy of the production database 226 at a prior point in time. For example, the instantiation of the jailed production database 234 can occur when the live application service system 200 begins testing the shadow engine 232. For another example, the live application service system 200 can periodically mirror copy the production database 226 to the jailed production database 234 according to a schedule (e.g., either depended on or regardless of which shadow engine is being tested).

After the secondary production engine 218B processes the client request and return to the second splitter engine 230, the second splitter engine 230 can process the client request through the shadow engine 232. For example, the shadow engine 232 can process a write request by modifying a dataset in the shadow database 238. In some embodiments, the shadow database 238 is instantiated as a mirror copy of the production database 226 at a previous point in time. In some embodiments, the shadow database 238 can be instantiated at the same time as when the jailed production database 234 is instantiated.

In several embodiments, a test analytic engine 252 can compute a difference between states of the secondary production engine 218B and the shadow engine 232. The test analytic engine 252 can be coupled to the second splitter engine 230. The test analytic engine 252 can compute the difference in response to the shadow engine 232 finishing the processing of the client request. In some embodiments, the test analytic engine 252 can be part of the live application service system 200. In some embodiments, the test analytic engine 252 is a standalone component in communication with the live application service system 200.

The test analytic engine 252 can include a comparator module 254. The comparator module 254 is configured to compare and track the states of the secondary production engine 218B and the shadow engine 232. In some embodiments, the comparator module 254 can track and compare the data content of the jailed production database 234 and the shadow database 238, performance metric, resource consumption, and/or operating memory states of the primary production engine 218A and the shadow engine 232, or any combination thereof (herein referred to as the "states of the secondary production engine 218 and the shadow engine 232"). The second splitter engine 230 can alert the comparator module 254 when the shadow engine 232 completes its processing of a client request. In response to the alert, the comparator module 254 can compute a difference of the states of the secondary production engine 218B and the shadow engine 232. The computed difference can be stored in an analytic database 260. The analytic database 260 can include one or more testing reports. In some embodiments, each testing report is associated with a version of the shadow engine 232. In some embodiments, each testing report is associated with a client request. In some embodiments, each testing report is associated with a timestamp.

Functional components (e.g., engines, modules, and databases) associated with the live application service system 100 and/or the live application service system 200 can be implemented as circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). The systems, engines, or devices described may include additional, fewer, or different functional components for various applications.

Figure 3:
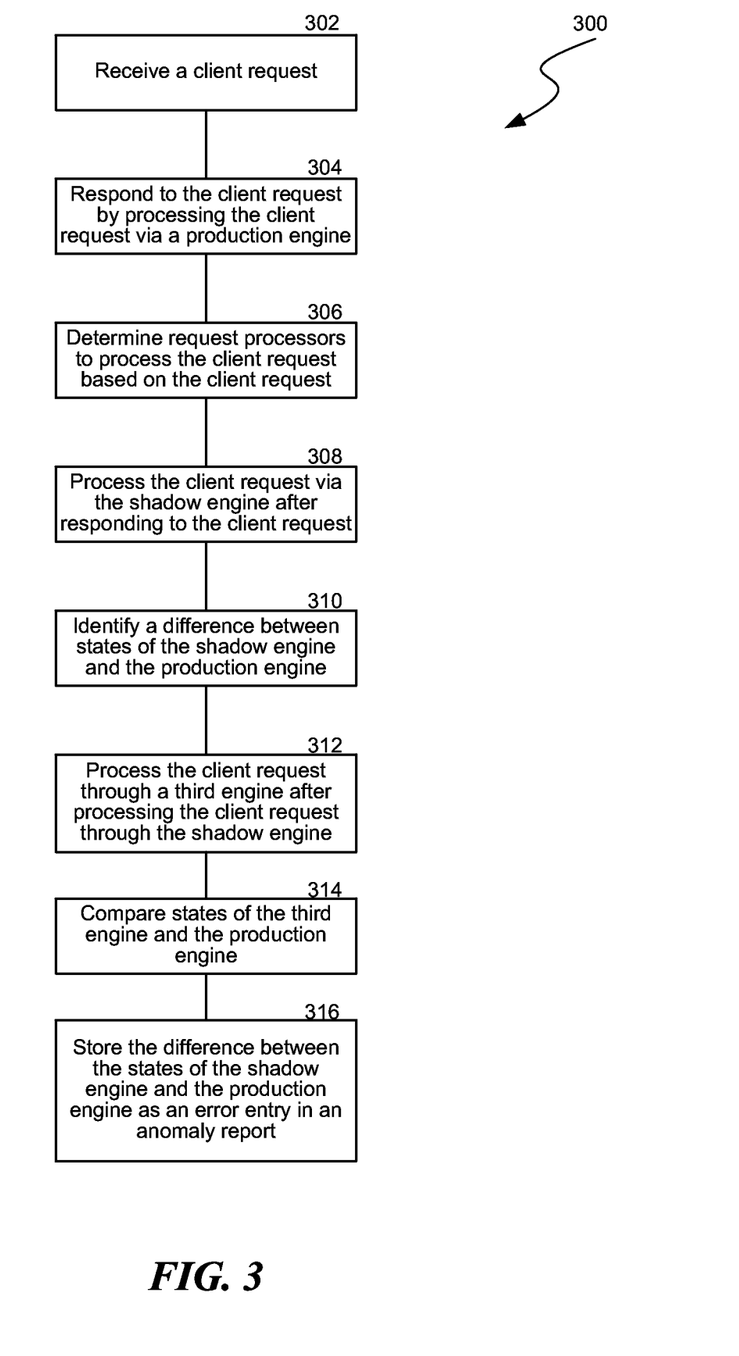
FIG. 3 is a flow chart of a method of comparing performance of a production engine and a shadow engine against live traffic data, in accordance with various embodiments.

FIG. 3 is a flow chart of a method 300 of comparing performance of a production engine and a shadow engine against live traffic data, in accordance with various embodiments. For example, the method 300 can be performed by a live application service system (e.g., the live application service system 100 of FIG. 1 or the live application service system 200 of FIG. 2). At block 302, a splitter engine (e.g., the splitter engine 112 of FIG. 1) receives a client request for an application service from a client (e.g., one of the client devices 102 of FIG. 1). The application service can be running live and exposed to an external network.

At block 304, the splitter engine responds to the client request with a live response by causing the client request to be processed via a production engine (e.g., the production engine 118 of FIG. 1) to generate the live response. Causing the client request to be processed can include sending the client request to the production engine and receiving the live response from the production engine. At block 306, the splitter engine determines, based on the client request, one or more request processors to process the client request and a processing order for the request processors. For example, a processing hierarchy can define which request processors process what types of client requests. The production engine can be a mandatory request processor. The request processors can include a shadow engine (e.g., the shadow engine 122 of FIG. 1), a simulated product engine, another splitter engine, other logical component, or any combination thereof. The shadow engine can be a potential production engine being tested against live traffic without interfering with the production engine. In some embodiments, determining the one or more request processors includes determining that the client request requires no modification to a production database maintained by the production engine. Then, responsive to determining that the client request requires no modification, the splitter engine can schedule to process the client request through the shadow engine in response to responding to the client request with the live response.

At block 308, the splitter engine causes the client request to be processed via the shadow engine after responding to the client request with the live response. Causing the client request to be processed via the shadow engine can include sending the client request to the shadow engine and receiving a test response generated by the shadow engine. At block 310, an anomaly detection component (e.g., the test analytic engine 132 of FIG. 1) identifies a difference between states of the shadow engine and the production engine. For example, identifying the difference can include comparing the live response and the test response.

In some embodiments, at block 312, the splitter engine causes the client request to be processed through a third engine after processing the client request through the shadow engine. For example, the third engine can be one of the request processors. Then, at block 314, the anomaly detection component compares states of the third engine and the production engine. In several embodiments, the splitter engine can determine a processing order to chain-process the client request using different pre-production request processors. The splitter engine can use regular expressions or other methods to categorize client requests to decide which of the request processors to push the client request to. This advantageously enables controlling of the operating environment of the testing. Some pre-production request processors may not be ready for some type of client requests. The splitter engine can avoid creating a known error by avoiding such pre-production request processor from processing that type of client requests. This way, the splitter engine can decide for different request processors whether to process a client request, what percentage of all client requests to pipe into each of the request processors, or other forms of individualized configuration.

At block 316, the anomaly detection component stores the difference between the states of the shadow engine and the production engine as an error entry in an anomaly report. The error entry can include the client request that caused the difference between the states of the shadow engine and the production engine. In some embodiments, the anomaly detection component can ignore specific types of error entry (e.g., type, magnitude, location of the identified difference). This advantageously reduces the computation and memory requirements for testing the shadow engine.

Figure 4:
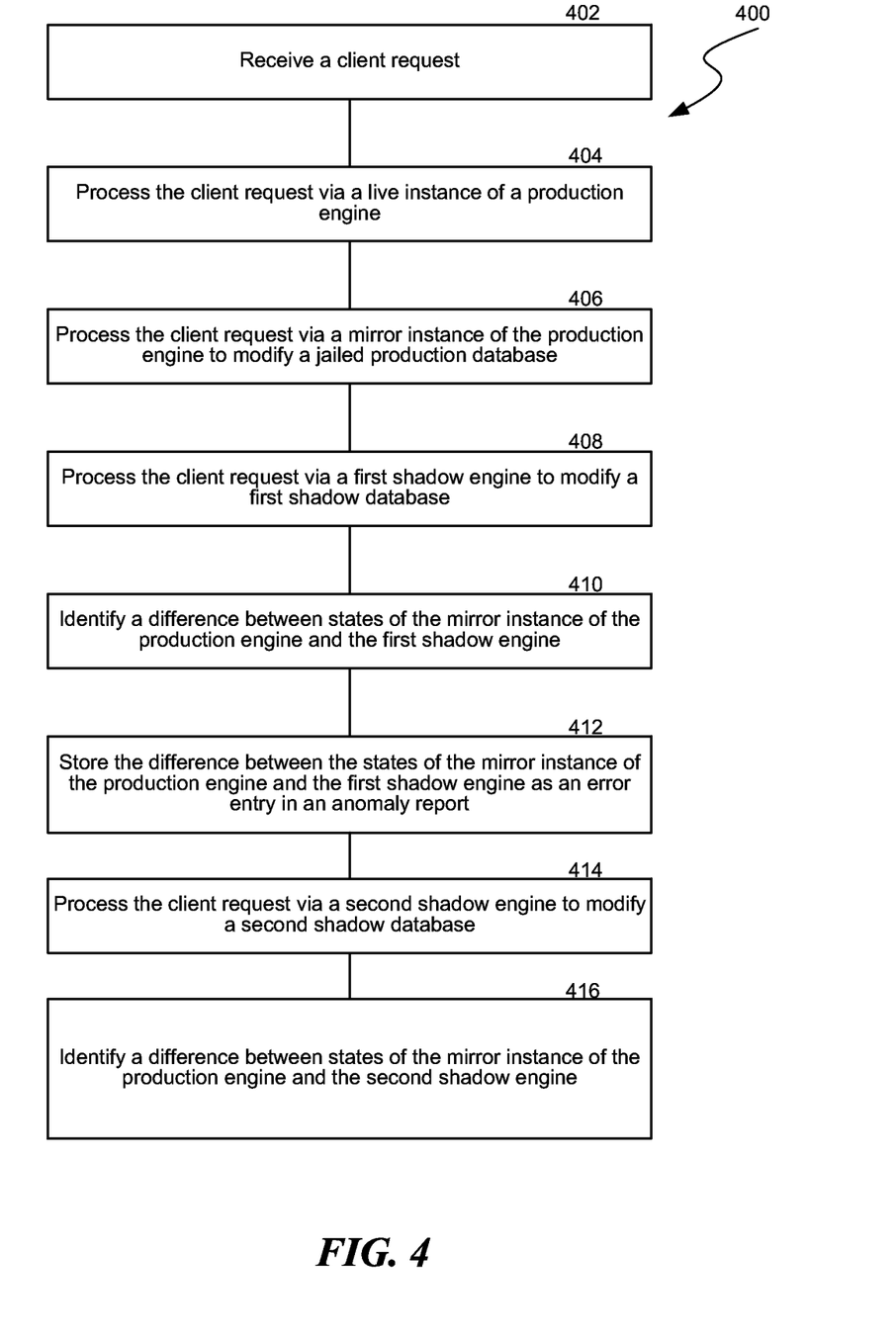
FIG. 4 is a flow chart of a method of comparing performance of a jailed production engine and a shadow engine against live traffic data, in accordance with various embodiments.

FIG. 4 is a flow chart of a method 400 of comparing performance of a jailed production engine and a shadow engine against live traffic data, in accordance with various embodiments. For example, the method 400 can be performed by a live application service system (e.g., the live application service system 100 of FIG. 1 or the live application service system 200 of FIG. 2). At block 402, a first splitter engine (e.g., the first splitter engine 212 of FIG. 2) receives a client request for a live application service. The client request can indicate, implicitly or explicitly, a dataset modification operation. In some embodiments, the client request can be a data update request, a data create request, a data delete request, or any combination thereof.

At block 404, the first splitter engine can cause the client request to be processed via a live instance of a production engine (e.g., the primary production engine 218A of FIG. 2) by modifying a live production database (e.g., the production database 226 of FIG. 2). In some embodiments, after processing the client request through the live instance of the production engine, the client request is passed to a second splitter engine (e.g., the second splitter engine 230 of FIG. 2). In some embodiments, the second splitter engine is the first splitter engine. At block 406, the second splitter engine can cause the client request to be processed via a mirror instance of the production engine (e.g., the secondary production engine 218B of FIG. 2) to modify a jailed production database (e.g., the jailed production database 234 of FIG. 2) after responding to the client request with a live response.

In some embodiments, the live application service system can seed the jailed production database with a mirror copy of the live production database prior to receiving the client request. For example, the live application service system can seed the jailed production database periodically according to a schedule. For another example, the live application service system can seed the jailed production database in response to instantiating the mirror instance of the production engine.

At block 408, the second splitter engine can cause the client request to be processed via a first shadow engine to modify a first shadow database after processing the client request via the mirror instance of the production engine. In some embodiments, the live application service system can seed the shadow database in response to seeding the jailed production database. The shadow database can be seeded with same data content as the jailed production database.

At block 410, an anomaly detection component (e.g., the test analytic engine 252 of FIG. 2) identifies a difference between states of the mirror instance of the production engine and the first shadow engine. For example, at block 412, the anomaly detection component can store the difference between the states of the mirror instance of the production engine and the first shadow engine as an error entry in an anomaly report. For example, the difference can be a difference in operating performance between a first computing environment executing the first shadow engine and a second computing environment executing the mirror instance of the production engine. In another example, the difference can be a difference in resource consumption between the first shadow engine and the mirror instance of the production engine. In another example, the difference can be a difference in operating memory states of the first shadow engine and the mirror instance of the production engine. In another example, the difference can be a difference in corresponding database entries in the shadow database and the jailed production database respectively. In another example, the difference can be a difference in request responses respectively produced by the mirror instance of the production engine and the first shadow engine.

In some embodiments, the anomaly detection component can count the number of error entries in the anomaly report. The anomaly detection component can signal to the live application service system shut down the first shadow engine in response to the number of error entries reaching a threshold. In some embodiments, in response to shutting down the first shadow engine, the live application system can re-deploy a new instance of the first shadow engine and create a new anomaly report.

In some embodiments, at block 414, the first splitter engine can process the client request via a second shadow engine to modify a second shadow database after processing the client request via the first shadow engine. At block 416, the anomaly detection component can identify a difference between states of the mirror instance of the production engine and the second shadow engine. In several embodiments, multiple splitter engines can chained together to represent a processing order to chain-process the client request using different pre-production request processors. The splitter engines can use regular expressions or other methods to categorize client requests to decide which of the request processors to push the client request to. Because of the chaining of the splitter engines, the processing of the client request by different request processors can be serial, according to a processing hierarchy embedded in the logics of the splitter engines. This advantageously enables controlling of the operating environment of the testing. This way, the splitter engines can decide for different request processors whether to process a client request, what percentage of all client requests to pipe into each of the request processors, or other forms of individualized configuration.

Figure 5:
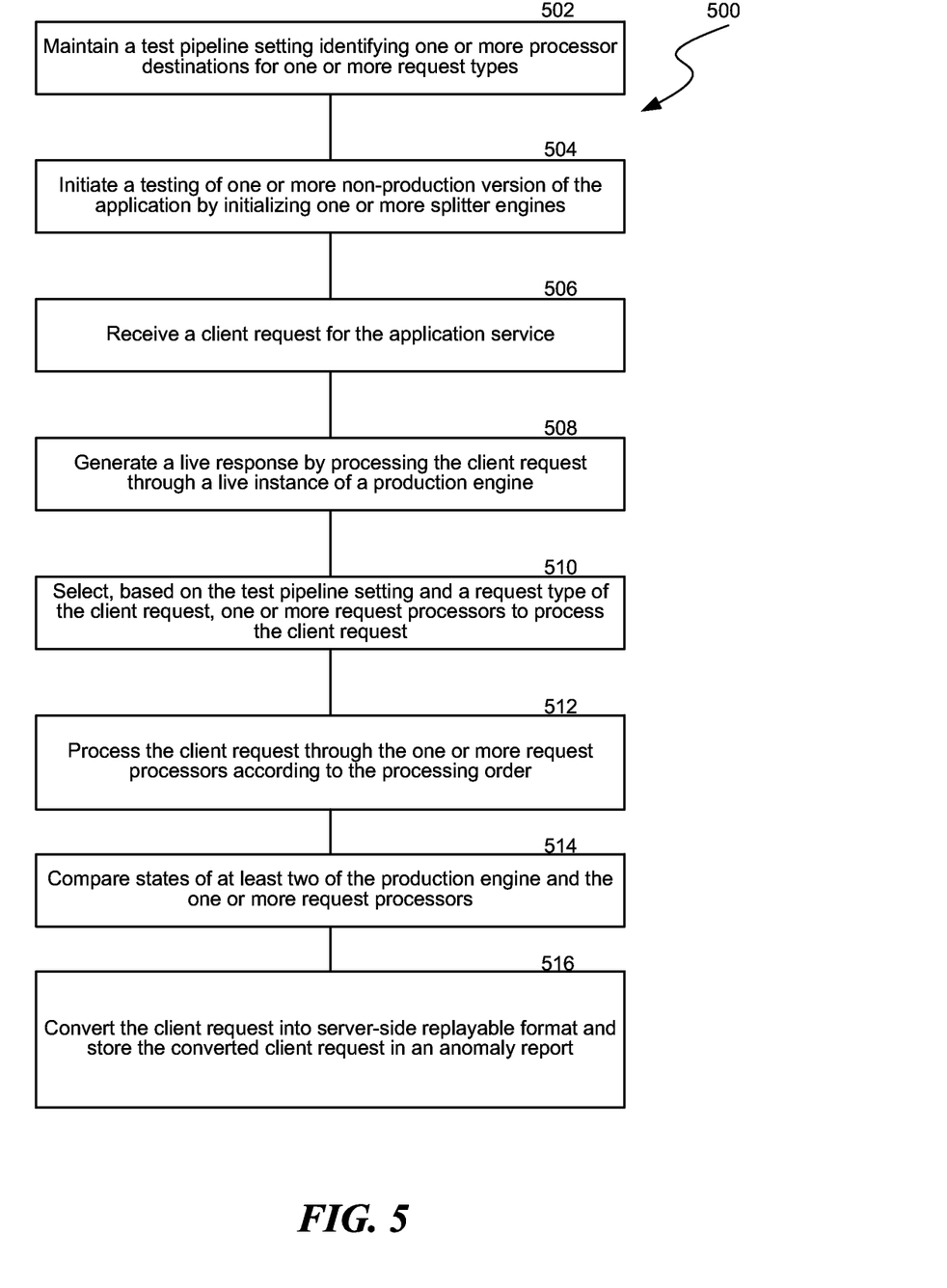
FIG. 5 is a flow chart of a method of identifying performance anomalies by monitoring live client requests and generating replayable error scenarios therefrom, in accordance with various embodiments.

FIG. 5 is a flow chart of a method 500 of identifying performance anomalies by monitoring live client requests and generating replayable error scenarios therefrom, in accordance with various embodiments. For example, the method 500 can be performed by a live application service system (e.g., the live application service system 100 of FIG. 1 or the live application service system 200 of FIG. 2). At block 502, the live application service system can maintain in its memory a test pipeline setting identifying one or more processor destinations for one or more request types.

At block 504, the live application service system can initiate a testing of one or more non-production version of the application by initializing one or more splitter engines (e.g., including the splitter engine 112 of FIG. 1, the first splitter engine 212 of FIG. 2, the second splitter engine 230 of FIG. 2, or any combination thereof). At block 506, the live application service system can receive a client request for the application service. At block 508, at least a splitter engine executed via the processor can generate a live response by causing the client request to be processed through a live instance of a production engine (e.g., the production engine 118 of FIG. 1 or the primary production engine 218A of FIG. 2).

At block 510, the splitter engine can select, based on the test pipeline setting and a request type of the client request, one or more request processors (e.g., including the shadow engine 122 of FIG. 1, the secondary production engine 218B of FIG. 2, the shadow engine 232 of FIG. 2, or any combination thereof) to process the client request and a processing order for the request processors. The one or more request processors can include a shadow engine, a mirror instance of the production engine operating a jailed production database, another splitter engine, or any combination thereof. In some embodiments, the splitter engine identifies the request type by maintaining a list of patterns matching different request types and running a search on content and metadata of the client request to determine if there is a match to the patterns (e.g., represented by regular expressions) in the list.

At block 512, the splitter engine can cause the client request to be processed through the one or more request processors according to the processing order after responding to the client request with the live response. At block 514, an anomaly detection component (e.g., the test analytic engine 132 of FIG. 1 or the test analytic engine 252 of FIG. 2) compares states of at least two of the production engine and the one or more request processors. For example, the anomaly detection component can identify a difference based on the comparison of the states. The anomaly detection component can store one or more patterns indicating an anomaly type that does not amount to an error. The anomaly detection component can store the identified difference in an anomaly report when the anomaly detection component identifies the difference as matching none of the one or more patterns.

At block 516, the anomaly detection component can convert the client request into server-side replayable format and store the converted client request in an anomaly report. This conversion is necessary because some parameters associated with the client request may not be present when a developer seeks to replay an error. For example, a client request may have security or cryptographic parameters associated with a secured session between the live application service system and an originating client device. In several embodiments, the anomaly detection component can convert the security or cryptographic parameters of the client request to be consistent with an on-server replay. For example, the anomaly detection component can remove the security requirement of the client request.

For another example, a client request may have network parameters associated with a network channel between the originating client device and the live application service system. In several embodiments, the anomaly detection component can convert the network parameters (e.g., port number, time stamp, network session identifier, client device identifier, or any combination thereof) to be consistent with a computer server emulating as a client to the application service.

In a specific example, the anomaly detection component can modify the HTTP Header "HOST" of the client request, such that the query is directed to a different host in shadow mode. The anomaly detection component can also modify HTTP Header "Authentication" of the client request for the authentication to work on a different server, e.g., the shadow server. The anomaly detection component can further parse the HTTP header to insert a prefix or suffix that indicates to a comparator module (e.g., the comparator module 136 of FIG. 1 or the comparator module 254 of FIG. 2) and the servers of the live application service system that the client request is to be processed without billing, crediting, or debiting to an account of the customer.

While processes or blocks are presented in a given order in the flow charts (e.g., FIG. 3, FIG. 4, and/or FIG. 5), alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. The methods described in the flow charts can be consistent with each other such that each can be executed together or independently with one another. In some embodiments, blocks or steps described in a method may overlap with blocks or steps described in another method.

Figure 6:
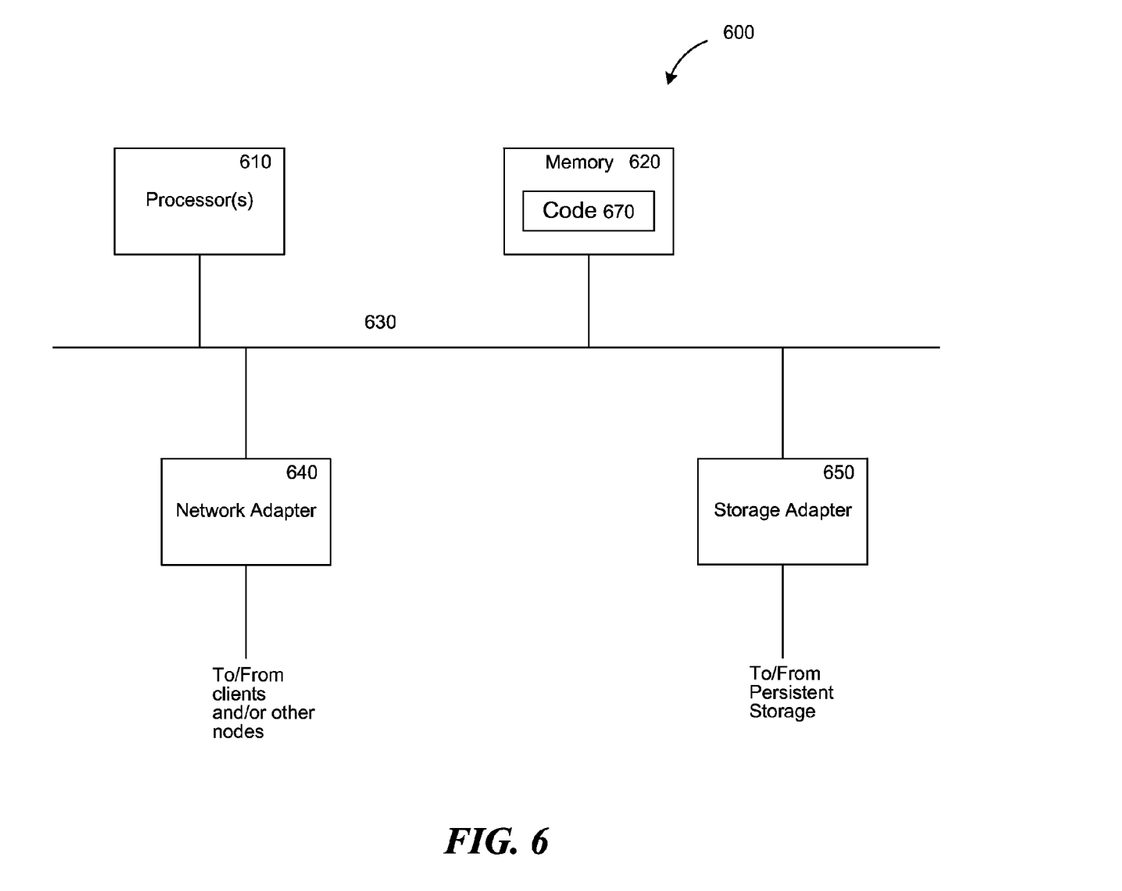
FIG. 6 is a block diagram of an example of a computing device, which may represent one or more computing device or server described herein, in accordance with various embodiments.

FIG. 6 is a block diagram of an example of a computing device 600, which may represent one or more computing device or server described herein, in accordance with various embodiments. The computing device 600 can be one or more computing devices that implement the live application service system 100 of FIG. 1, the live application service system 200 of FIG. 2, one or more components in either or both of the live application service systems, or any combination thereof. The computing device 600 can implement methods and processes described in this disclosure (e.g., the method 300, the method 400, and/or the method 500). The computing device 600 includes one or more processors 610 and memory 620 coupled to an interconnect 630. The interconnect 630 shown in FIG. 6 is an abstraction that represents any one or more separate physical buses, point-to-point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or a "Firewire".

The processor(s) 610 is/are the central processing unit (CPU) of the computing device 600 and thus controls the overall operation of the computing device 600. In some embodiments, the processor(s) 610 accomplishes this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computing device 600. The memory 620 represents any form of random access memory (RAM), read-only memory (ROM), flash memory, or the like, or a combination of such devices. In use, the memory 620 may contain a code 670 containing instructions according to the mesh connection system disclosed herein.

Also connected to the processor(s) 610 through the interconnect 630 are a network adapter 640 and a storage adapter 650. The network adapter 640 provides the computing device 600 with the ability to communicate with remote devices, over a network and may be, for example, an Ethernet adapter or Fibre Channel adapter. The network adapter 640 may also provide the computing device 600 with the ability to communicate with other computers. The storage adapter 650 enables the computing device 600 to access a persistent storage, and may be, for example, a Fibre Channel adapter or SCSI adapter.

The code 670 stored in memory 620 may be implemented as software and/or firmware to program the processor(s) 610 to carry out actions described above. In some embodiments, such software or firmware may be initially provided to the computing device 600 by downloading it from a remote system through the computing device 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

What is claimed is:

1. A computer-implemented method, comprising:
    receiving, from a client, a client request for an application service;
    responding to the client request with a live response by causing the client request to be processed by a production engine to generate the live response;
    determining a first state of the production engine as a result of processing the client request to generate the live response;
    identifying, based on the received client request, one or more request processors to process the client request and a processing order, wherein the one or more request processors includes a shadow engine, which is a potential production engine being tested against live traffic without interfering with the production engine;
    causing the received client request to be processed via the shadow engine after responding to the client request with the live response;
    determining a second state of the shadow engine as a result of processing the client request; and
    identifying a difference between the states of the shadow engine and the production engine.

2. The computer-implemented method of claim 1, further comprising storing the difference between the states of the shadow engine and the production engine as an error entry in an anomaly report; and wherein the error entry includes the client request that caused the difference between the states of the shadow engine and the production engine.

3. The computer-implemented method of claim 1, wherein determining the one or more request processors includes:
    determining that the client request requires no modification to a production database maintained by the production engine; and
    responsive to determining that the client request requires no modification, scheduling to process the client request through the shadow engine in response to responding to the client request with the live response.

4. The computer-implemented method of claim 1, further comprising:
    processing the client request through a third engine after processing the client request through the shadow engine; and
    comparing states of the third engine and the production engine.

5. The computer-implemented method of claim 1, wherein processing the client request includes generating a test response via the shadow engine; and wherein identifying the difference includes comparing the live response and the test response.

6. A computer-readable storage memory apparatus storing computer-executable instructions, comprising:
    instructions for receiving a client request for a live application service, wherein the client request indicates a dataset modification operation;
    instructions for causing the client request to be processed via a live instance of a production engine by modifying a live production database;

instructions for causing the client request to be processed via a mirror instance of the production engine to modify a jailed production database after responding to the client request with a live response;

instructions for determining a first state of the mirror instance of the production engine as a result of processing the client request;

instructions for causing the client request to be processed via a first shadow engine to modify a first shadow database after processing the client request via the mirror instance of the production engine;

instructions for determining a second state of the first shadow engine as a result of processing the client request; and instructions for identifying a difference between the states of the mirror instance of the production engine and the first shadow engine.

7. The computer-readable storage memory apparatus of claim 6, further comprising:

instructions for causing the client request to be processed via a second shadow engine to modify a second shadow database after processing the client request via the first shadow engine; and instructions for identifying a difference between states of the mirror instance of the production engine and the second shadow engine.

8. The computer-readable storage memory apparatus of claim 6, further comprising:

instructions for seeding the jailed production database with a mirror copy of the live production database prior to receiving the client request.

9. The computer-readable storage memory apparatus of claim 8, further comprising:

instructions for seeding the shadow database in response to seeding the jailed production database; and wherein the shadow database is seeded with same data content as the jailed production database.

10. The computer-readable storage memory apparatus of claim 6, further comprising:

instructions for storing the difference between the states of the mirror instance of the production engine and the first shadow engine as an error entry in an anomaly report instructions for counting a number of error entries in the anomaly report; and instructions for shutting down the first shadow engine in response to the number of error entries reaching a threshold.

11. The computer-readable storage memory apparatus of claim 10, further comprising:

instructions for, in response to shutting down the first shadow engine, re-deploying a new instance of the first shadow engine and creating a new anomaly report.

12. The computer-readable storage memory apparatus of claim 6, wherein the difference between the states of the mirror instance of the production engine and the first shadow engine is a difference in operating performance between a first computing environment executing the first shadow engine and a second computing environment executing the mirror instance of the production engine.

13. The computer-readable storage memory apparatus of claim 6, wherein the difference between the states of the mirror instance of the production engine and the first shadow engine is a difference in resource consumption between the first shadow engine and the mirror instance of the production engine.

14. The computer-readable storage memory apparatus of claim 6, wherein the difference between the states of the mirror instance of the production engine and the first shadow engine is a difference in operating memory states of the first shadow engine and the mirror instance of the production engine.

15. The computer-readable storage memory apparatus of claim 6, wherein the difference between the states of the mirror instance of the production engine and the first shadow engine is a difference in corresponding database entries of the shadow database and the jailed production database respectively.

16. The computer-readable storage memory apparatus of claim 6, wherein the difference between the states of the mirror instance of the production engine and the first shadow engine is a difference in request responses respectively produced by the mirror instance of the production engine and the first shadow engine.

17. A computing device, comprising:

a processor;

a network interface component configured to receive a client request for a live application service;

a memory for maintaining a test pipeline setting identifying one or more processor destinations for one or more request types;

a splitter engine executed via the processor; wherein the splitter engine is configured to:

generate a live response by causing the client request to be processed through a live instance of a production engine;

determine a first state of the production engine as a result of processing the client request to generate the live response;

select one or more request processors to process the client request and a processing order based on the test pipeline setting and a request type of the client request; and cause the client request to be processed through the one or more request processors according to the processing order after responding to the client request with the live response;

determine a second state of the one or more request processors as a result of processing the client request; and a test analytic engine executed via the processor; wherein the test analytic engine is configured to compare the states of at least two of the production engine and the one or more request processors.

18. The computing device of claim 17, wherein the memory stores one or more patterns indicating an anomaly type that does not amount to an error; and wherein the test analytic engine is configured to store a difference, from the comparing of the states, in an anomaly report when the test analytic engine identifies the difference as matching none of the one or more patterns.

19. The computing device of claim 18, wherein the test analytic engine is configured to convert the client request into server-side replayable format and store the converted client request.

20. The computing device of claim 17, wherein the one or more request processors includes a shadow engine, a mirror instance of the production engine operating a jailed production database, another splitter engine, or any combination thereof.

* * * * *